(12) United States Patent
Klausner et al.

(10) Patent No.: US 7,046,638 B1
(45) Date of Patent: May 16, 2006

(54) WIRELESS ACCESS TO CLOSED EMBEDDED NETWORKS

(75) Inventors: Markus Klausner, Wexford, PA (US); Arne Dietrich, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 793 days.

(21) Appl. No.: 09/687,181

(22) Filed: Oct. 12, 2000

(51) Int. Cl.
*H04Q 7/00* (2006.01)

(52) U.S. Cl. ............... 370/313; 370/466; 455/345; 455/423; 701/29

(58) Field of Classification Search ........... 370/466, 370/532, 533, 535, 467, 313; 701/29, 207, 701/33, 32; 702/187, 73; 342/357.06; 340/505, 340/870.14, 870, 431; 307/9.1, 10.1; 709/217; 455/345, 99, 423, 457; 713/151
See application file for complete search history.

(56) References Cited

U.S. PATENT DOCUMENTS

| | | | |
|---|---|---|---|
| 5,442,553 A * | 8/1995 | Parrillo | 455/420 |
| 5,682,257 A * | 10/1997 | Uchida | 398/43 |
| 5,732,074 A * | 3/1998 | Spaur et al. | 370/313 |
| 6,107,917 A * | 8/2000 | Carrender et al. | 340/505 |
| 6,181,994 B1 * | 1/2001 | Colson et al. | 701/33 |
| 6,272,130 B1 * | 8/2001 | Panahi et al. | 370/366 |
| 6,327,275 B1 * | 12/2001 | Gardner et al. | 370/535 |
| 6,330,499 B1 * | 12/2001 | Chou et al. | 701/33 |
| 6,389,036 B1 * | 5/2002 | Stewart et al. | 370/466 |
| 6,389,337 B1 * | 5/2002 | Kolls | 701/29 |
| 6,411,203 B1 * | 6/2002 | Lesesky et al. | 340/431 |
| 6,467,039 B1 * | 10/2002 | Fredriksson | 713/151 |
| 2002/0001317 A1 * | 1/2002 | Herring | 370/493 |

FOREIGN PATENT DOCUMENTS

| | | |
|---|---|---|
| EP | 0 872 990 | 10/1998 |
| WO | WO 97/01940 | 1/1997 |
| WO | WO 97/26750 | 7/1997 |
| WO | WO 98/53581 | 11/1998 |

OTHER PUBLICATIONS

Lars-Berno Fredriksson et. al., The Potential of Bluetooth in Automotive Applications, Bluetooth Geneva Conference, Apr. 4-5, 2000. Entire white paper.*
Lars-Berno Fredriksson et. al., Bluetooth in Automotive Applications, Bluetooth '99 conference, Oct. 15, 1999. Entire white paper.*
Beyeler et al., "Communication Framework for Remote Vehicle Access," SAE Technical Paper Series, Society of Automotive Engineers, Inc., 2000, pp. 1-4.
H. Wunderlich et al.: "Opening Bluetooth For Technical Tasks—Possibilities And Challenges For Automotive Applications," Bluetooth Conference, Jun. 13, 2000, pp. 1-16.

* cited by examiner

*Primary Examiner*—Chau Nguyen
*Assistant Examiner*—Ian N. Moore
(74) *Attorney, Agent, or Firm*—Kenyon & Kenyon LLP

(57) ABSTRACT

A method and system is provided for a protocol translation device that may include two different protocols and an intermediate, network-independent protocol. In an embodiment, an emerging worldwide standard, Bluetooth, provides a wireless interface to the electronics in an automotive vehicle via the de-facto standard for vehicle buses, Controller Area Network (CAN). A remote application can connect to this interface via a Bluetooth host in the vehicle or in communication range of the vehicle.

31 Claims, 3 Drawing Sheets

WIRELESS ACCESS TO CLOSED EMBEDDED NETWORKS

FIELD OF THE INVENTION

The present invention relates to a protocol translation device. More specifically, a protocol translation device is provided that can be used for automotive diagnostic purposes as well as other purposes.

BACKGROUND INFORMATION

Access to in-vehicle electronics is known in the art. Access to in-vehicle electronics currently requires special hardware that is connected directly to the vehicle bus through an OBDII (On-Board Diagnostic) connector or some other physical connection. Further, hardware that is dedicated to a certain kind of wireless link (e.g., Groupe Spécial Mobile (GSM) phone) has been proposed for remote diagnosis.

There are several inherent problems with the current method of accessing in-vehicle electronic information. One problem is the amount of time it can take to attach the OBDII connector. Also, it may be difficult to find the OBDII connector within the engine bay or in another spot in the vehicle if one is not entirely familiar with the layout of the car, adding to the total time exhausted.

Another problem with the current method of attachment to the in-vehicle electronics is the limitation upon freedom of movement for the operator. With the connector attached to the vehicle, the operator is forced to avoid the connector line as he moves around the vehicle while repairing the vehicle, etc. This could affect an operator's efficiency. There could also be a hazard of tripping over the wire as the operator moves back and forth around the vehicle.

Further, another limitation of the prior art is the necessity for the presence of the vehicle for physical attachment to the operator's equipment. In order to access the in-vehicle electronics, an actual physical connection must be made. This can be inconvenient for the vehicle owner. Also, in the case of a mechanic's usage of the prior art for access to in-vehicle electronics, a problem exists diagnosing intermittent problems and problems occurring only during vehicle operation. With the prior art, a vehicle's electronics cannot be accessed in real time while the car is in motion.

By providing a means to access the vehicle electronics without the requirement of a physical connection, the present invention eliminates the above-mentioned problems. In view of the above and for other reasons, there is a need for a system and method that provides wireless access to a bus, such as that provided in an automobile.

SUMMARY OF THE INVENTION

A protocol translation device is disclosed that may include two different protocols and an intermediate, network-independent protocol. In one embodiment of the invention, an emerging worldwide standard, Bluetooth, created by the Wireless Personal Area Network (WPAN) Working Group (IEEE 802.15), provides a wireless interface to the electronics in the vehicle via a Controller Area Network (CAN). CAN is an international standard documented in ISO 11898 (for high-speed applications) and ISO 11519 (for lower-speed applications). A remote application can connect to this interface via a Bluetooth host in the vehicle or in communication range of the vehicle. Such a Bluetooth host could be a mobile phone or an onboard computer.

According to an embodiment of the present invention, a protocol translation can occur from Controller Area Network (CAN) protocol to Bluetooth protocol, and the signal in the Bluetooth protocol can then be transmitted from the vehicle's electronic systems' bus to an external receiver via a wireless link.

Such an interface would enable external devices to subscribe to certain signals on the vehicle bus or interrogate a vehicle's electronic control units (ECUs) without interfering with the vehicle's operation.

Aftermarket products are emerging that notify other drivers of traffic conditions such as traffic jams and accidents. These systems could be greatly enhanced if they had access to data on the vehicle bus, as this would improve the system's knowledge about the state of every participating vehicle.

DETAILED DESCRIPTION

Figure 1:
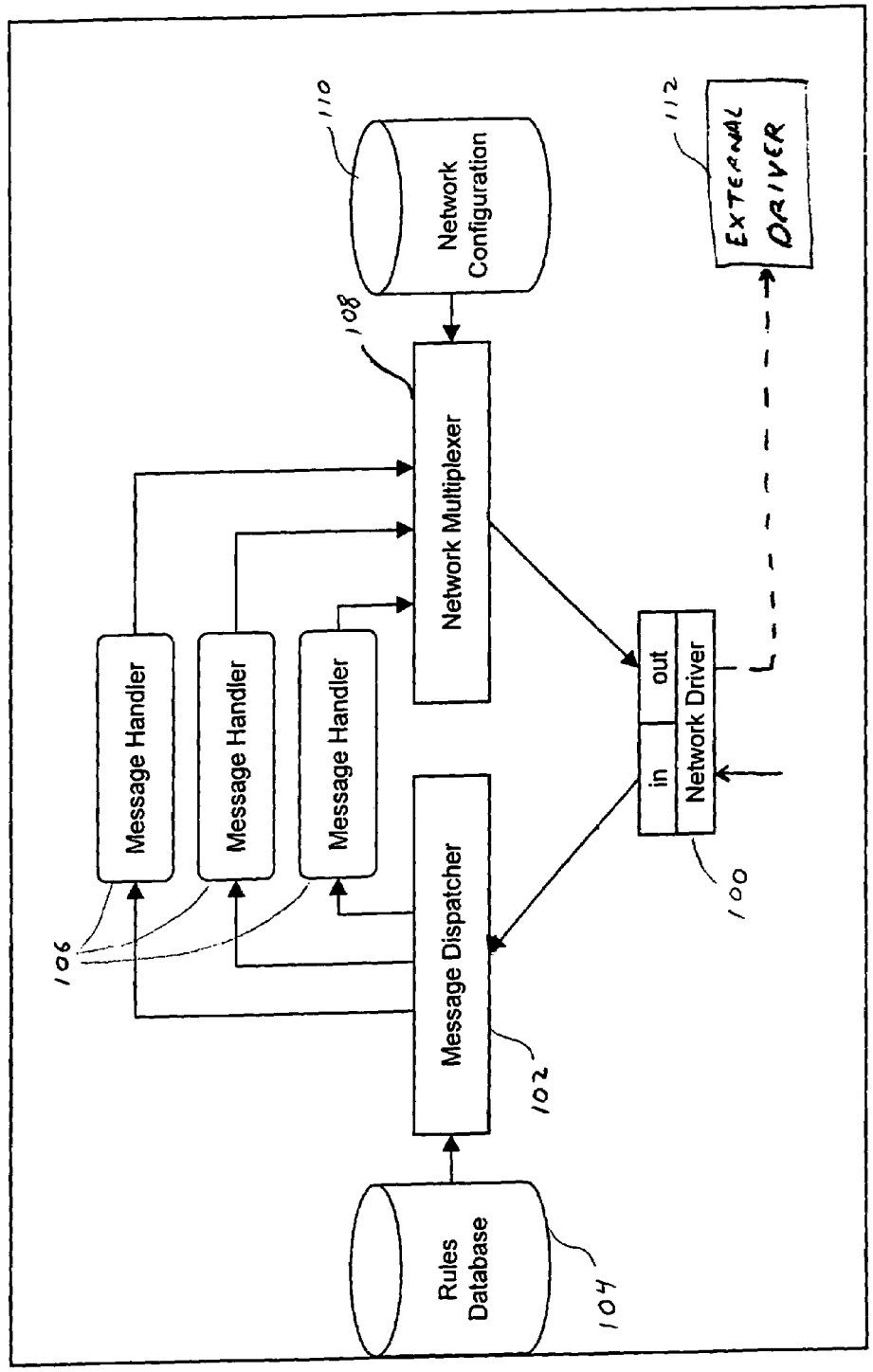
FIG. 1 shows a block diagram of protocol translation according to one possible embodiment of the present invention.

FIG. 1 shows a block diagram of the protocol translation according to an embodiment of the present invention. A first driver, which is denoted in the embodiment of FIG. 1 as the 'in' side of the Network Driver 100, receives a message of a first protocol from a given network for translation. The Network Driver 100 first converts the received message of the first protocol to a new, network-independent protocol. The Network Driver 100 then passes the message to a Message Dispatcher 102 whereupon the Message Dispatcher 102 consults a Rules Database 104 to determine which Message Handler 106 out of a plurality of Message Handlers 106 to forward the network-independent message. The Message Handler 106 fills the destination fields of the message. The Message Handlers 106 utilize specialized packet translation involving address changes, network changes segmentation/desegmentation, etc. The Message Handlers 106 further provide accessibility of external applications for signal extraction, etc.

The Message Handler 106 involved in the transfer then forwards the message to a Network Multiplexer 108, which consults the address and network fields of the network-independent message to identify the destination network. A Network Configuration Unit 110 is utilized by the Network Multiplexer 108 to configure and connect the gateway software components for such things as system startup and maintenance and for dynamic reconfiguration.

The Network Multiplexer 108 then passes the network-independent message to a second driver, which is denoted as the 'out' side of the Network Driver 100. The Network Driver 100 then converts the network-independent message to a second protocol. The message is forwarded on from the Network Driver 100 to a third driver, called External Driver 112, from which the message is utilized by a remote host of some type.

Figure 2:
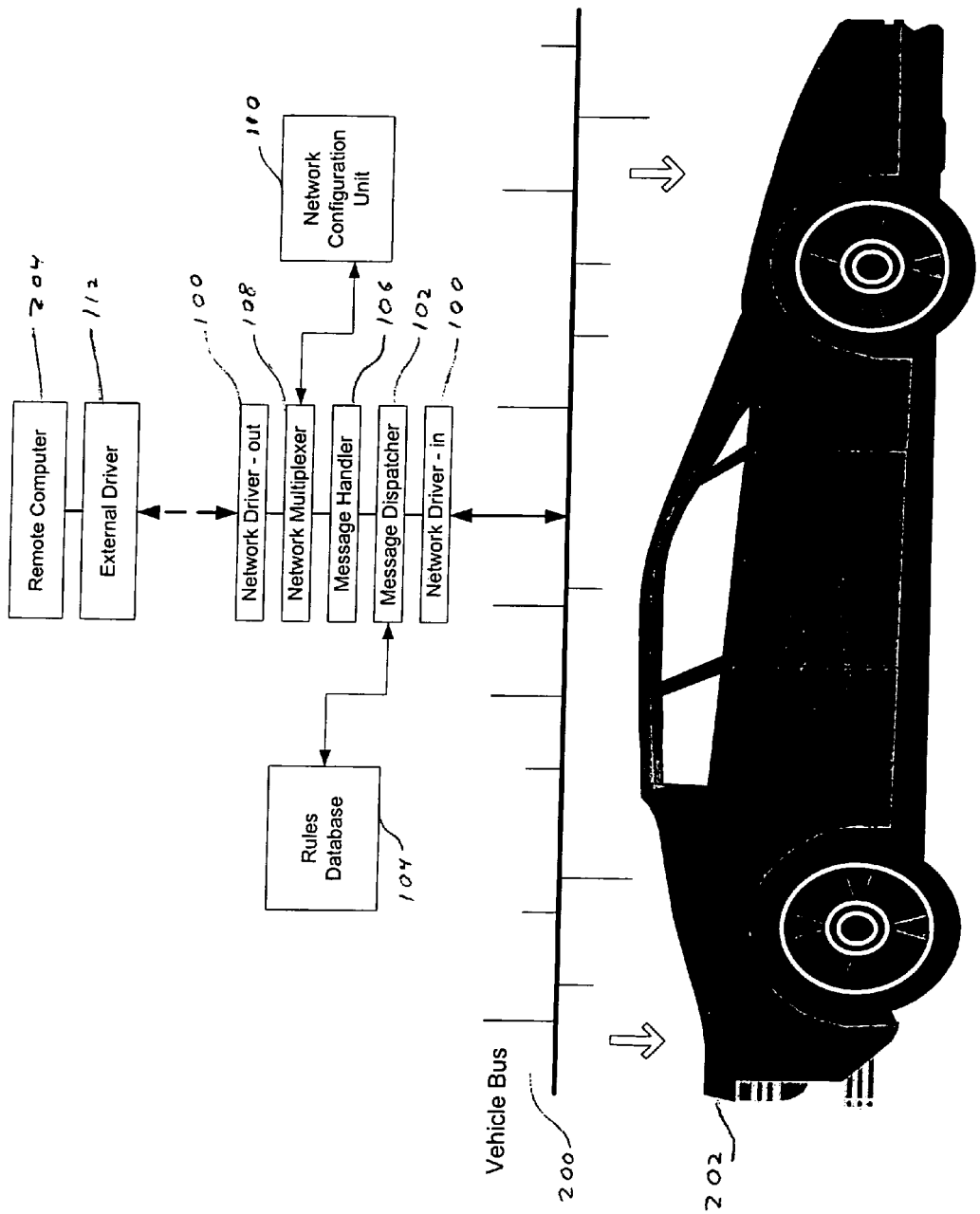
FIG. 2 shows an embodiment of the protocol translation system of FIG. 1 operating in an automotive environment.

FIG. 2 shows this protocol translation system operating in an automotive environment. In the depicted embodiment, the vehicle bus 200 within the vehicle 202 provides a pathway for data communication between various electronic components located throughout the vehicle. The data being passed upon the vehicle bus is accessed by a first network driver, which, similar to FIG. 1, is denoted as 'Network Driver-in' 100. The data message received by Network Driver 100 is converted to a network-independent protocol, as is stated above, and then the message is passed to a Message Dispatcher 102, which utilizes a Rules Database 104 to determine which Message Handler 106 should receive the message. As stated previously, upon receipt of the network-independent message, the Message Handler 106 fills the destination fields of the message and utilizes specialized packet translation involving address changes, network changes segmentation/desegmentation, etc.

The Message Handler 106 forwards the network-independent message to a Network Multiplexer 108, which consults the address and network fields of the message to identify the destination network. As stated above, a Network Configuration Unit 110 is utilized by the Network Multiplexer 108 to configure and connect the gateway software components for such things as system startup and maintenance and for dynamic reconfiguration.

The Network Multiplexer 108 then passes the network-independent message to a second driver, which is denoted as 'Network Driver-out' 100. The Network Driver 100 then converts the network-independent message to a second protocol. The message is forwarded on from the Network Driver 100 to a third driver, called External Driver 112, from which the message is utilized by a Remote Computer 204.

Figure 3:
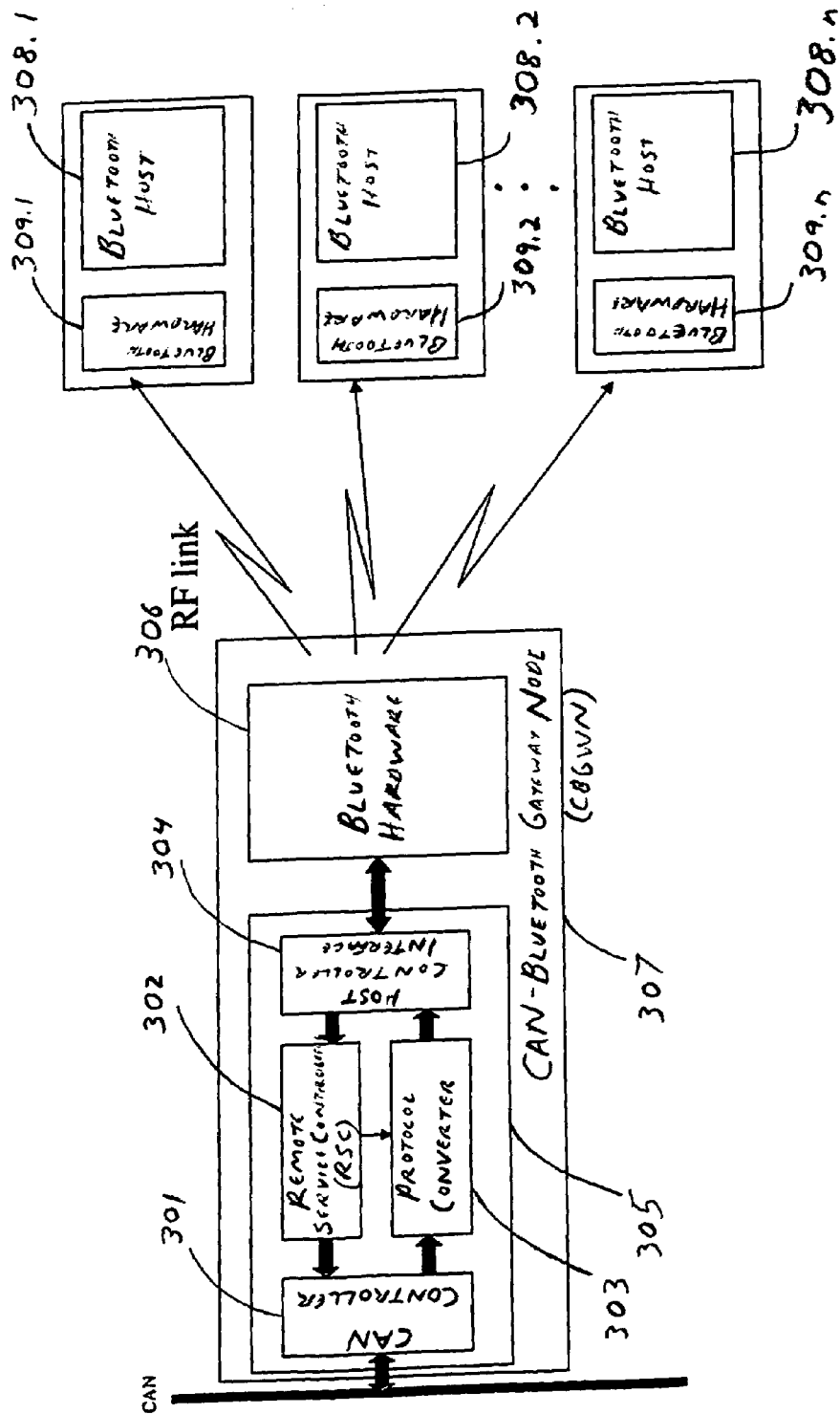
FIG. 3 provides a block diagram of a specific CAN-to-Bluetooth embodiment of the present invention.

FIG. 3 provides a block diagram of a specific CAN-to-Bluetooth embodiment of the present invention. As is previously stated, the present invention concerns a node in an in-vehicle bus network that comprises gateway functionality for passing messages from the in-vehicle bus to a remote host, and a wireless communication chipset for establishing, maintaining, and controlling a wireless link between the node and one or several remote hosts. In the following, the invention is described for a CAN as the in-vehicle communication protocol and Bluetooth as short-range wireless communication standard. FIG. 3 depicts the core concept of this embodiment of the present invention.

The CAN-Bluetooth gateway node (CBGWN) 307 includes a Bluetooth host 305 and Bluetooth hardware 306 connected via a host controller interface (HCI) 304. The Bluetooth host comprises a CAN controller 301, a remote service controller (RSC) 302, a protocol converter 303, and a host controller interface device 304. The Bluetooth hardware 306 enables a wireless link to other Bluetooth hardware (309.1 . . . 309.n) connected to Bluetooth hosts (308.1 . . . 308.n) via an HCI. This setup enables a remote application, which does not necessarily reside on any of the remote Bluetooth hosts (308.1 . . . 308.n), to communicate with the RSC 302. Such a remote application could be a diagnosis program on a server that is linked to the CBGWN through a mobile phone that is one of the Bluetooth hosts (308.1 . . . 308.n).

The CAN controller 301 controls the communication with the Vehicle Bus 200 (FIG. 2). Signals contained in CAN messages that pass the acceptance filter of the CAN controller 301 are passed on to the protocol converter 303. The protocol converter 303 retrieves CAN signals from CAN messages, computes the actual physical value of signals such as speed or RPM (typically by applying a scaling factor), and then puts them in the payload of the target protocol's protocol data units (PDUs). In an advantageous implementation, the CAN signals are directly assigned to data packets that can be sent via the host controller interface (HCI) to the Bluetooth host controller. The RSC 302 controls which signals are put in the PDUs as described later. The gateway functionality of the protocol converter also comprises: the readressing (1:n) of messages based on subscriber management implemented in the RSC 302 (see below); the resequencing (i.e., changing the temporal order of received and retransmitted messages); and the changing of timing behavior.

If a packet-switched connection exists between CBWGN 307 and a remote application, the link between the CAN-connected Bluetooth host 305 and a remote Bluetooth host (308.1 . . . 308.n) is an asynchronous connection-less link (ACL link). Next, the CAN signals are assigned to HCI ACL packets. Recommended Standard 232 (RS232) as specified by the Electrical Industries Association (EIA) could serve as the HCI transport layer, for example. It is possible to assign one PDU to each incoming CAN message, one PDU to each incoming signal, and one PDU to several incoming CAN messages and signals.

The data rate and the throughput of the wireless link are among the factors that determine the allocation procedure.

In this embodiment, no remote application that connects to the CBGWN 307 has direct access to the CAN in the vehicle. This means, no remote application can generate CAN messages. Yet, to go beyond the capability of passively listening to bus traffic, the transmission of CAN messages by the CBGWN 307 is supported as follows: The RSC 302 stores a predefined set of CAN messages that the CAN gateway node can transmit on the bus, along with the identifiers and rules for the messages that are allowed to be transmitted (e.g. debounce time for event-triggered messages and period for periodic messages). This ensures that the worst-case bus load can be analyzed without any knowledge of future remote applications. CAN messages that the CBGWN 307 is allowed to transmit would typically include challenge-response message schemes for diagnosis. When such a message is sent to an ECU, the ECU sends a reply containing failure codes or more generally, certain data from its memory. To initiate the transmission of challenge-response messages, a remote application sends a request via a remote Bluetooth host (308.1 . . . 308.n) to the RSC 302. After authenticating and authorizing the remote application (see below), the RSC 302 initiates the transmission of the messages via the CAN controller 301. Also, the RSC 302 notifies the protocol converter 303 to assign the signals contained in the response messages to PDUs to be passed on to the remote application.

The protocol converter 303 has a-priori knowledge of the start bits and length of the signals in each received CAN message that can pass the acceptance filter and assigns them to PDUs that can be interpreted by the remote Bluetooth host (308.1 . . . 308.n). For this purpose, in the CBWGN, a list is stored of CAN messages and the signals contained therein as well as the corresponding PDUs of the target protocol.

In an advantageous implementation, each remote host (308.1 . . . 308.n) is authenticated by the RSC 302. In an authorization procedure, the RSC 302 verifies the subscription privileges of the remote application (not necessarily the remote host). The subscription privileges concern the list of signals to which a remote application can subscribe. Also, the subscription privileges would indicate whether the remote application is allowed to initiate challenge-response schemes. The communication between the remote application and the RSC 302 can be encrypted independently of the encryption functionality provided by Bluetooth. In an advantageous application, a public key encryption method is used, where the private key of the CBGWN 307 is stored in the CBGWN 307 and is unknown to others. Remote applications that want to subscribe to messages must obtain the public key for the CBGWN 307, which gives a manufacturer some control of the subscribers. Moreover, the public keys of the remote applications would need to be stored in the CBGWN 307, allowing only applications that have the corresponding private key to communicate with the CBGWN 307. An alternative to this method would be a ticket-based authentication method such as Kerberos, a network authentication protocol designed by Massachusetts Institute of Technology to provide strong authentication for client/server applications by using secret-key cryptography.

The CBGWN 307 is not necessarily a stand-alone ECU. The described functionality could be implemented in an existing ECU or in a distributed system. The overall vehicle bus architecture determines to which bus the CBGWN 307 should be connected. It is essential that all data of interest are available to the CBGWN 307. If these data originate from ECUs that are connected to a bus other than the bus to which the CBGWN 307 is connected, a wireline-to-wireline gateway (e.g., CAN—CAN) between the two buses would ensure that the messages of interest are passed on to the CBGWN 307. For example, if the GBGWN 307 is attached to the powertrain CAN and needs data from the airbag controller (e.g., for an accident notification application), a gateway should exist between the powertrain CAN and the CAN to which the airbag controller is attached.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A method for translating a message of a first protocol received by a first driver to a second protocol transmitted by a second driver, comprising:
   receiving the message from the first driver by a message dispatcher before transmitting the message to a message handler, wherein the message dispatcher selects the message handler from a set of one or more message handlers by consulting a database;
   converting the message received by the first driver to an independent format;
   transmitting the message from the first driver to the second driver via the message handler; and
   converting the message received by the second driver in the independent format to the second protocol; where
   the first driver and the second driver are located in a vehicle and the first protocol is a vehicular protocol; and
   the second protocol is a wireless link.

2. The method of claim 1, further comprising:
   receiving the message from the message handler by a multiplexer before transmitting the message to the second driver.

3. The method of claim 2, wherein the multiplexer utilizes a network configuration unit for at least one of system startup, maintenance, and dynamic reconfiguration.

4. The method of claim 1, further comprising:
   performing a manipulation on the message in the message handler.

5. The method of claim 4, wherein the manipulation includes at least one of packet translation and interaction with a computer application.

6. The method of claim 1, further comprising transmitting the message from the second driver to a third driver.

7. The method of claim 2, wherein the multiplexer is a network multiplexer.

8. The method of claim 1, wherein the database is a rules database.

9. The method of claim 6, further comprising transmitting the message from the second driver to the third driver in the second protocol by wireless communication.

10. The method of claim 1, wherein the first protocol is a Controller Area Network protocol.

11. The method of claim 1, wherein the second protocol is a Bluetooth protocol.

12. The method of claim 9, wherein the message received by the third driver is translated back to the first protocol and received by a fourth driver.

13. The method of claim 9, wherein a remote application in communication with the third driver is capable of receiving the message.

14. The method of claim 13, wherein the remote application is capable of either passively receiving the message or initiating a transmission from the third driver back to the second driver for translation and receipt at the first driver in the first protocol.

15. The method of claim 14, wherein the third driver is unable to communicate with the second driver unless the third driver adheres to predefined transmission rules and transmits messages from only a predefined group of possible messages.

16. A system for translating a message of a first protocol to a second protocol, comprising:
   a first driver adapted to receive the message of the first protocol and convert the message to an independent format;
   a message handler adapted to receive the message from the first driver;
   a message dispatcher adapted to receive the message from the first driver before transmitting the message to the message handler, wherein the message dispatcher is adapted to select the message handler from a set of one or more message handlers by consulting a database; and
   a second driver adapted to receive the message from the message handler and adapted to convert the message received in the independent format to the second protocol; where
   the first driver and the second driver are located in a vehicle and the first protocol is a vehicular protocol; and
   the second protocol is a wireless link.

17. The system of claim 16, wherein a multiplexer is adapted to receive the message from the message handler before transmitting the message to the second driver.

18. The system of claim 17, wherein the multiplexer is adapted to utilize a network configuration unit for at least one of system startup, maintenance, and dynamic reconfiguration.

19. The system of claim 16, wherein the message handler is adapted to perform a manipulation on the message.

20. The system of claim 19, wherein the manipulation includes at least one of packet translation and interaction with a computer application.

21. The system of claim 16, further comprising a third driver coupled to the second driver.

22. The system of claim 17, wherein the multiplexer is a network multiplexer.

23. The system of claim 16, wherein the database is a rules database.

24. The system of claim 16, wherein the message is transmitted from the second driver to a third driver in the second protocol by wireless communication.

25. The system of claim 16, wherein the first protocol is a Controller Area Network protocol.

26. The system of claim 16, wherein the second protocol is a Bluetooth protocol.

27. The system of claim 24, wherein the message received by the third driver is translated back to the first protocol and received by a fourth driver.

28. The system of claim 24, wherein a remote application in communication with the third driver is capable of receiving the message.

29. The system of claim 28, wherein the remote application is capable of either passively receiving the message or initiating a transmission from the third driver back to the second driver for translation and receipt at the first driver in the first protocol.

30. The system of claim 24, wherein the third driver is unable to communicate with the second driver unless the third driver adheres to predefined transmission rules and transmits messages from only a predefined group of possible messages.

31. A system for translating a message of a Controller Area Network protocol to a Bluetooth protocol, comprising:
   a first driver adapted to receive the message of the Controller Area Network protocol and convert the message to an independent format;
   a message handler adapted to receive the message from the first driver;
   a second driver adapted to receive the message from the message handler and adapted to convert the message received in the independent format to the Bluetooth protocol;
   a message dispatcher adapted to receive the message from the first driver before transmitting the message to the message handler, wherein the message dispatcher is adapted to select the message handler from a set of one or more message handlers by consulting a rules database; and
   a third driver coupled to the second driver; where
   the first driver and the second driver are located in a vehicle;
   a network multiplexer is adapted to receive the message from the message handler before transmitting the message to the second driver;
   the network multiplexer is adapted to utilize a network configuration unit for at least one of system startup, maintenance, and dynamic reconfiguration;
   the message handler is adapted to perform a manipulation on the message that includes at least one of packet translation and interaction with a computer application;
   the message is transmitted from the second driver to the third driver in the Bluetooth protocol by wireless communication; and
   a remote application in communication with the third driver is capable of either passively receiving the message or initiating a transmission from the third driver back to the second driver for translation and receipt at the first driver in the Controller Area Network protocol.

* * * * *